United States Patent [19]

Geka et al.

[11] Patent Number: 4,784,498
[45] Date of Patent: Nov. 15, 1988

[54] RETAINER OF A LINEAR MOTION ROLLING-CONTACT BEARING AND ITS MANUFACTURING METHOD

[75] Inventors: Toshiaki Geka, Funabashi; Koji Kanoh, Mino, both of Japan

[73] Assignee: Nippon Thompson Co., Ltd., Japan

[21] Appl. No.: 38,478

[22] Filed: Apr. 13, 1987

Related U.S. Application Data

[63] Continuation of Ser. No. 772,799, Sep. 5, 1985, abandoned.

[30] Foreign Application Priority Data

Sep. 5, 1984 [JP]  Japan ............................... 59-184468

[51] Int. Cl.[4] ............................................. F16C 29/06
[52] U.S. Cl. .......................................... 384/45; 384/44
[58] Field of Search ............................. 384/45, 43, 44; 464/168

[56] References Cited

U.S. PATENT DOCUMENTS

4,441,765  4/1984  Kasai et al. ....................... 308/6 C
4,557,530  12/1985  Haase ................................ 308/6 C

*Primary Examiner*—Lenard A. Footland
*Attorney, Agent, or Firm*—Thomas S. MacDonald; Alan H. MacPherson; Paul J. Winters

[57] ABSTRACT

A retainer for use in a linear motion rolling-contact bearing is provided. In a linear motion rolling-contact bearing, there is provided an endless passage including a load passage section, a return passage sections and a pair of connection passage sections connecting the corresponding ends of the load and return passage sections. The rolling members, balls or rollers, are provided in the endless passage and they move endlessly so as to provide a relative motion between a rail and a slider assembly. The return and connection passage sections are defined in the slider assembly, but the load passage section is defined between the rail and the slider assembly so that there is normally provided a retainer for retaining the rolling members in position when they pass through the load passage section. The retainer of the present invention basically includes a flat base portion formed with an elongated slot having a width larger than the maximum size of each of the rolling members used and a central retaining portion formed integrally with the flat base portion and having a generally U shape.

7 Claims, 7 Drawing Sheets

RETAINER OF A LINEAR MOTION ROLLING-CONTACT BEARING AND ITS MANUFACTURING METHOD

This application is a continuation of application Ser. No. 06/772,799, filed Sept. 5, 1985, now abandoned.

BACKGROUND OF THE INVENTION

1. Field of the Invention

This invention generally relates to a rolling-contact bearing, and, in particular to a retainer for use in a linear motion rolling-contact bearing for allowing a slider assembly to move along an unlimited length of a guide rail and its manufacturing method.

2. Background of the Invention

A linear motion rolling-contact bearing is well known in the art. This bearing is provided between a straight guide rail and a slider assembly which straddles the guide rail so as to allow the slider assembly to move along the guide rail however long it may be. Such a bearing typically comprises an endless passage in the form of a closed loop defined between the guide rail and the slider assembly and rolling members arranged in the passage, whereby the rolling members roll along the passage as the slider assembly moves along the guide rail so that the silder assembly may move unlimitedly no matter how long the guide rail may be.

The endless passage generally includes a load passage section which runs straight and which is defined by opposed guide grooves provided on the opposed surfaces of the slider assembly and the guide rail, a return passage section which runs generally in parallel with the load passage section, and a pair of connecting passage sections each of which connects the corresponding ends of the load and return passage sections, thereby allowing the rolling members to move along the passage in one direction when the slider moves in the other direction. The rolling members are typically spheres or cylindrical rollers. The bearing also includes a retainer which is typically provided in the load passage section of the endless passage so as to retain the rolling members properly in position and to guide the movement of the rolling members entering into and exiting from the load passage section.

Figure 2:
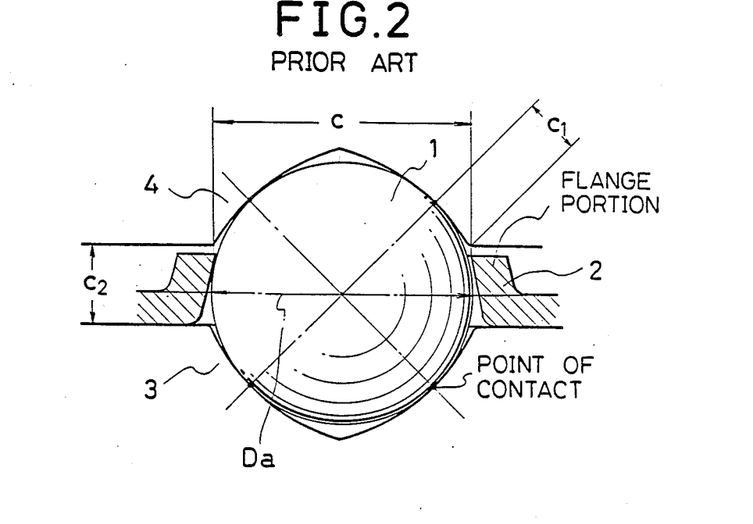
FIG. 2 is a schematic illustration showing part of a linear motion rolling-contact bearing having a prior art retainer.

FIG. 2 shows schematically in cross section the structure of the load passage section of such a linear motion rolling-contact bearing employing balls as rolling members. As shown, defined between a slider assembly 3 and a rail 4 is the load passage section in which a ball 1 having a diameter Da is present in rolling contact with the slider assembly 3 and the rail 4. Mounted on the slider assembly 3 is a retainer 2 which has a pair of flange portions which are formed by bending the end portions away from the slider assembly 3 toward the rail 4. The flange portions come closer toward their tip ends where there is defined a distance C between the tip ends of the flange portions, which is smaller than the diameter Da of the ball 1. With this structure, the retainer 2 can retain the ball 1 at the side of the slider assembly 3.

It is to be noted, however, that the flange portions must be formed to have a substantial height so as to secure a sufficient retaining distance which is defined by Da - C. The provision of such high flange portions between the slider assembly 3 and the rail 4 is not advantageous because the grooves formed in the opposed surfaces of the slider assembly 3 and the rail 4 for defining the load passage section tend to be shallow.

SUMMARY OF THE INVENTION

It is therefore a primary object of the present invention to obviate the disadvantages of the prior art as described above and to provide an improved linear motion rolling-contact bearing.

Another object of the present invention is to provide a retainer for retaining rolling members along a predetermined passage in a linear motion rolling-contact bearing and a manufacturing method thereof.

A further object of the present invention is to provide a retainer for retaining rolling members of a linear motion rolling-contact bearing having an increased retaining distance.

A still further object of the present invention is to provide a retainer for retaining rolling members of a linear motion rolling-contact bearing simple in structure, reliable in operation and easy, and thus less expensive, to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 3:
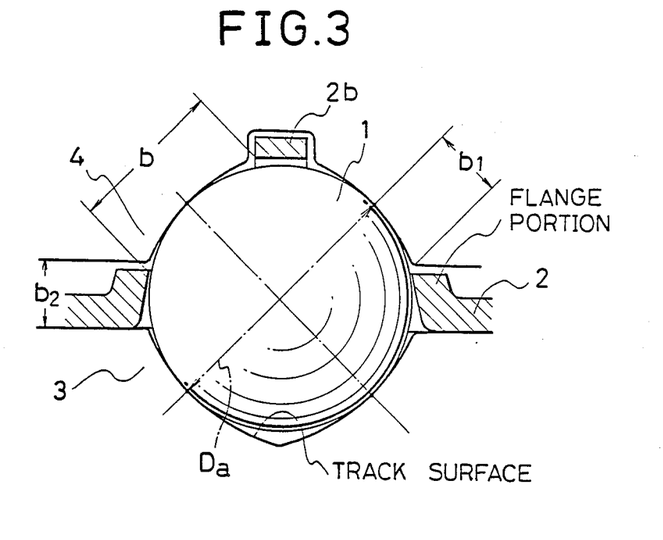
FIG. 3 is a schematic illustration showing part of a linear motion rolling-contact bearing having a retainer which includes a center retaining portion so as to provide an increased retaining length.

As shown in FIG. 3, if provision is made for a central retaining portion 2b as extending along the load passage section, there is provided an increased retaining distance which is defined by Da - b, where b is the minimum distance between the tip end of the flange portion and the closer side of the central retaining portion $2b$. However, the provision of such a central retaining portion $2b$ in addition to the flange portions of the retainer 2 makes it difficult to manufacture. Since the flange portions are provided, the distance $b_2$ between the slider assembly 3 and the rail 4 is almost comparable to the distance $c_2$ in the prior art structure of FIG. 2, so that the guide grooves formed in the slider assembly 3 and the rail 4 are still shallow.

Figure 1:
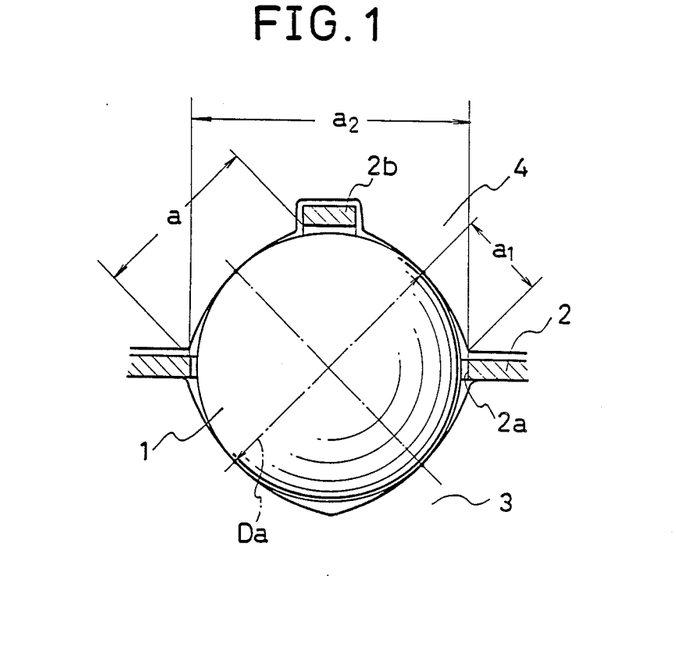
FIG. 1 is a schematic illustration showing part of a linear motion rolling-contact bearing having a retainer constructed in accordance with one embodiment of the present invention.

Referring now to FIG. 1, there is provided a linear motion rolling-contact bearing which is constructed in accordance with one embodiment of the present invention and which incorporates therein an improved retainer. As shown, the linear motion rolling-contact bearing includes a ball 1 located in the load passage section defined by the grooves formed in the opposite surfaces of the slider assembly 3 and the rail 4. Also provided as mounted on the slider assembly 3 is a retainer 2 which includes a central retaining portion $2b$ which extends longitudinally along the load passage section as will become clear later. It is to be noted that the central retaining portion $2b$ is integrally formed as part of the retainer 2 for retaining the ball 1 in the predetermined endless passage defined in the slider assembly 3. It should further be noted that no flange portion is provided in the present retainer 2; on the other hand, that portion of the retainer 2 located between the slider assembly 3 and the rail 4 is comprised of a flat plate as attached to the slider assembly 3 and having an end surface $2a$ which serves as a ball retaining surface.

With this structure, the retaining distance is defined by Da - a, where a is the minimum distance between the retaining end surface $2a$ and the central retaining portion $2b$. Thus, the retaining distance is much larger than the prior art structure of FIG. 2 having no central retaining portion; moreover, since the side retaining portion is provided not by a flange but by an end surface of a flat plate portion of the retainer 2, the opposed guide grooves are deeper and thus the distance between the slider assembly 3 and the rail 4 is smaller. It should thus be appreciated that a coverage distance between the edge of the guide groove and the point of contact between the ball 1 and the groove, i.e., $a_1$ in FIG. 1, $c_1$ in FIG. 2 and $b_1$ in FIG. 3, is increased in the embodiment shown in FIG. 1. This indicates that the ball 1 is more structurally enclosed so that the manufacturing tolerances may be relaxed. It should further be noted with respect to the structure shown in FIG. 1 that the distance $a_2$ between the opposed retaining end surfaces $2a$ of the retainer is made larger than the diameter Da of the ball 1. Such a structure is possible due to the provision of the central retaining portion $2b$. Accordingly, in the structure of FIG. 1, it holds that Da is much larger than a, but Da is smaller than $a_2$.

Figure 5:
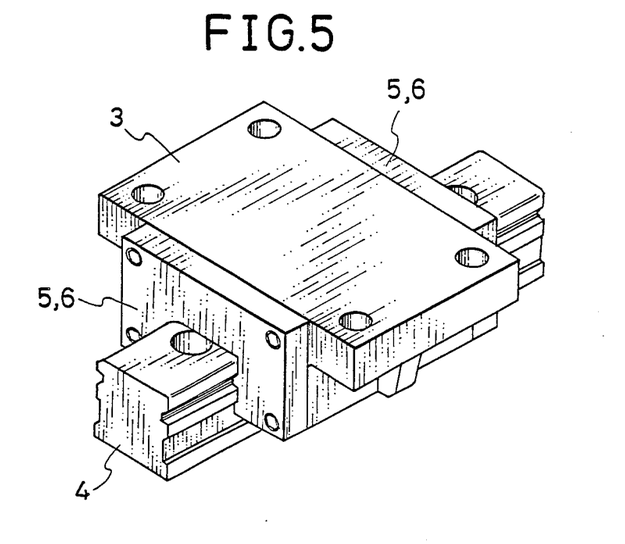
FIG. 5 is a perspective view showing a slider assembly and rail combination into which a linear motion rolling-contact bearing having the present retainer is advantageously incorporated.

FIG. 5 shows in perspective view a linear motion rolling-contact bearing constructed in accordance with one embodiment of the present invention. As shown, there is provided an elongated rail 4 which extends straight The rail 4 is generally rectangular in cross section and provided with guide grooves, one on each side surface. Also provided is a slider assembly 3 which straddles the rail 4 and moves along the rail 4 in either direction. As will become clear later, the slider assembly is provided with a pair of endless passages, in each of which a plurality of rolling members 1, balls in the present embodiment, are provided to move along the passages endlessly. Each of the endless passage may be divided into four sections: load passage section defined between the slide assembly 3 and the rail, return passage section defined inside of the slider assembly 3 and a pair of connection passage sections connecting the corresponding ends of the load and return passage sections. The load and return passage sections extend generally straight in parallel with the longitudinal axis of the rail 4; on the other hand, the pair of connection passage sections are appropriately curved so as to transfer the balls 1 between the load and return passage sections.

Figure 6:
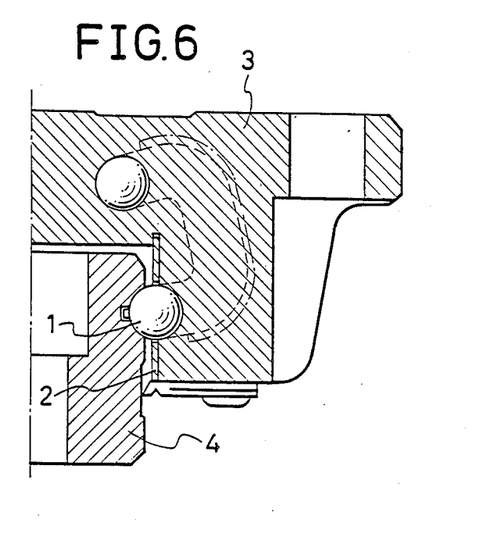
FIG. 6 is a partial, transverse cross-sectional view showing how the present retainer is attached to the slider assembly 3.

Referring now to FIG. 6, it is seen that the load passage section is defined between the slider assembly 3 and the rail 4, more specifically by the opposed guide grooves formed in the opposed side surfaces of the slider assembly 3 and the rail 4. The balls 1 in the load and return passage sections are indicated, and the connection passage section connecting the load and return passage sections is indicated by the dotted line. The retainer 2 is mounted on the slider assembly 3 as attached to the inner side surface thereof. Since the retainer 2 has a central retaining portion, the guide groove defined in the side surface of the rail 4 is formed with a central recess for receiving therein the central retaining portion of the retainer 2. With the provision of the retainer 2, the balls 1 are properly guided into and out of the load passage section from and to the connection passage sections, respectively.

Figure 7:
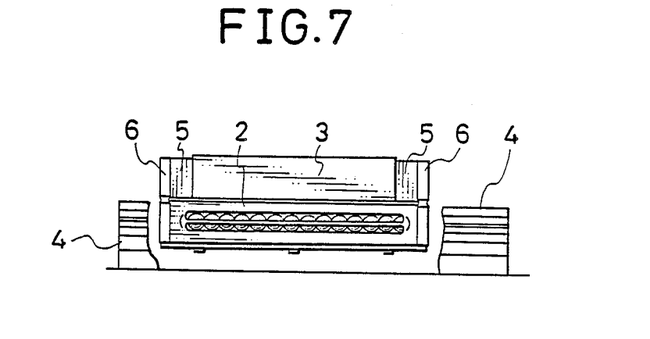
FIG. 7 is a schematic illustration showing in longitudinal view how the present retainer retains the balls in the load passage section.
Figure 8:
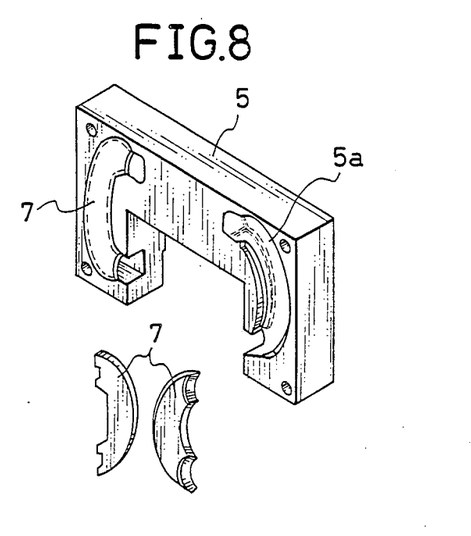
FIG. 8 is an exploded, perspective view showing the structure of the end plate 5 forming part of the slider assembly 3.

As shown in FIG. 7, the slider assembly 3 includes a pair of end plates 5, 5 and a pair of seal members 6, 6. Each of the end plates 5, 5 is formed with a pair of curved grooves $5a$, $5a$, as shown in FIG. 8. Also shown in FIG. 8 is a pair of curved inserts 7, 7 which may be attached to the side plate 5 thereby defining a pair of connection passage sections. From FIG. 7, it is clear that the retainer 2 is generally rectangular in shape and is provided with an elongated slot which generally defines the load passage section. The slot has a width which is slightly larger than the balls 1, but since the retainer 2 is also provided with the central retaining portion which is generally in the shape of an inverted U when viewed from the side extending from one end of the slot to its other end. The central retaining portion includes a pair of curved end parts rising from a plate-shaped base portion of the retainer 2 and a horizontal part connected between the curved end parts. Thus, the balls 1 enter into the load passage section as guided by the curved end part of the central retaining portion $2b$ of the retainer 2 and move along the load passage section in rolling contact with the guide grooves defined in the opposed side surfaces of the slider assembly 3 and the rail 4; then, enter into the other connection passage section from the load passage section as guided by the other curved end part of the central retaining portion $2b$.

Figures 9, 10:
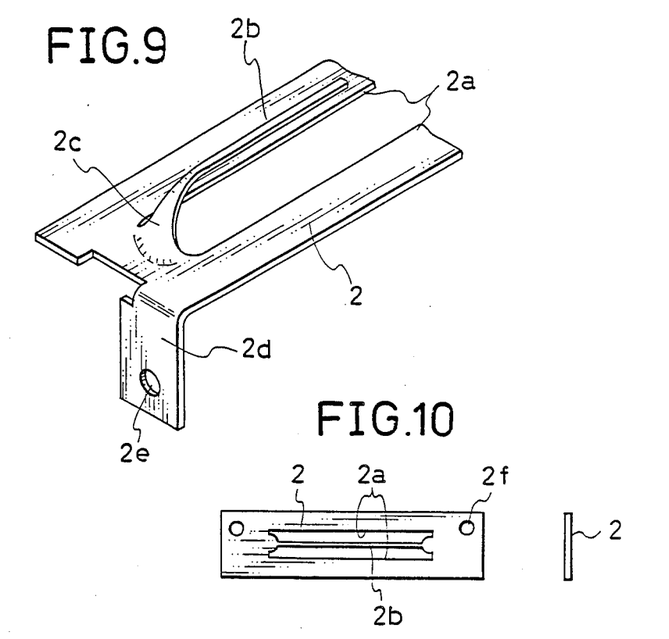
FIG. 9 is a partial, perspective view showing the structure of the retainer embodying the present invention.
FIGS. 10 through 14 are schematic illustrations showing several steps in a process for manufacturing the present retainer in accordance with one embodiment of the present invention.

FIG. 9 shows in detail the retainer 2 used in the above-described linear motion rolling-contact bearing. It includes a plate-shaped base portion which is generally rectangular and which is provided with an elongated slot which defines a pair of opposed retaining end surfaces $2a$, $2a$. As mentioned previously, the width of the slot, or the distance between the opposed retaining end surfaces $2a$, $2a$, is slightly larger than the diameter Da of the balls used. The retainer 2 also includes a central retaining portion $2b$ which is comprised of a pair of curved end parts and a horizontal part. In FIG. 9, only one curved end part of the central retaining portion 2b is shown as extending upward from one end of the slot as curved to merge into the horizontal part which extends parallel with the longitudinal axis of the slot. Thus, even if the slot has the width which is slightly larger than the diameter Da of the balls 1, the provision of the central retaining portion 2b allows the balls 1 to be properly guided into and out of the load passage section and keeps the balls 1 in the load passage section. The retainer 2 is also provided with a pair of mounting tabs 2d, only one of which is shown in FIG. 9, each of which is formed with a mounting hole 2e, so that the retainer 2 may be fixedly attached to the slider assembly 3, for example, by means of bolts provided to extend through the corresponding mounting hole 2e.

Figure 11:
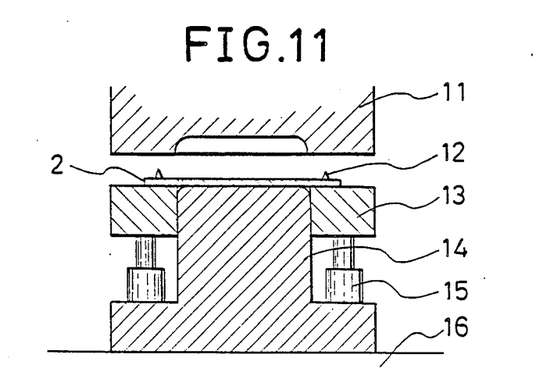
Figure 12:
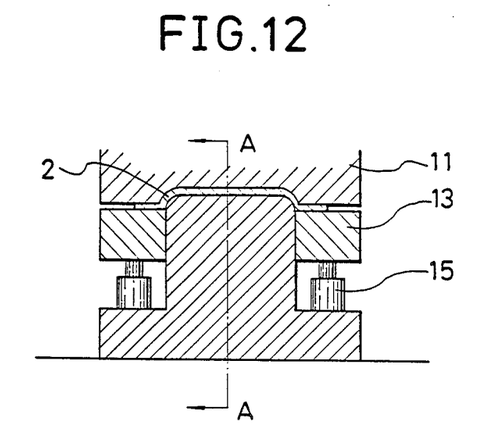

Now, a process for manufacturing the retainer 2, shown in FIG. 9, will be described with reference to FIGS. 10 through 14. FIG. 10 shows a blanking step in which a sheet of metal having a desired shaped as shown is formed by blanking. Thus, the to-be-formed retainer 2 is still plate-shaped, and a slot is formed with the to-be-formed central retaining portion 2b extending in the form of a bridge. The blanked sheet of metal is also formed with a pair of alignment holes 2f, 2f. FIG. 11 shows the beginning of a forming step for forming the blanked sheet metal into a desired form. As shown in FIG. 11, the blanked sheet metal is placed on a punch table 14 which sits on base 16 and which is flanked by a pair of liners 15, 15 which hold thereon respective side supports 13, 13. Thus, when placed in position, the central portion of the blanked sheet metal sits on the top of the punch table 14 and the side portions of the blanked sheet metal lie on the respective side supports 13, 13. Above the punch table 14 is disposed a die 11 which is formed with a cavity having a desired shape at its bottom.

Figure 13:
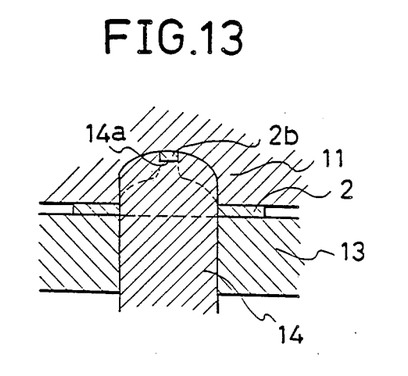

Thus, when the die 11 is moved downward under pressure, the side supports 13, 13 move downward together with the die 11 with the side portions of the blanked sheet metal sandwiched therebetween. On the other hand, the central portion of the blanked sheet metal is formed into a desired shape as defined between the top of the punch table 14 and the bottom of the die 11. In this case, as shown in FIG. 13, which is a cross sectional view taken along line A—A in FIG. 12, the bottom cavity of the die 11 is preferably provided with a central relief groove for receiving therein the central retaining portion 2b of the retainer 2 thus formed. As a result of this forming step, the central retaining portion 2b is formed such that it includes a pair of curved end parts 2c, 2c which rise from the flat base portion to a predetermined height and a central horizontal part having both ends connected to the respective curved end parts 2c, 2c. That is, as a result of this forming step, the central retaining portion 2b is formed into the shape of the inverted U when viewed from the side.

Figure 14:
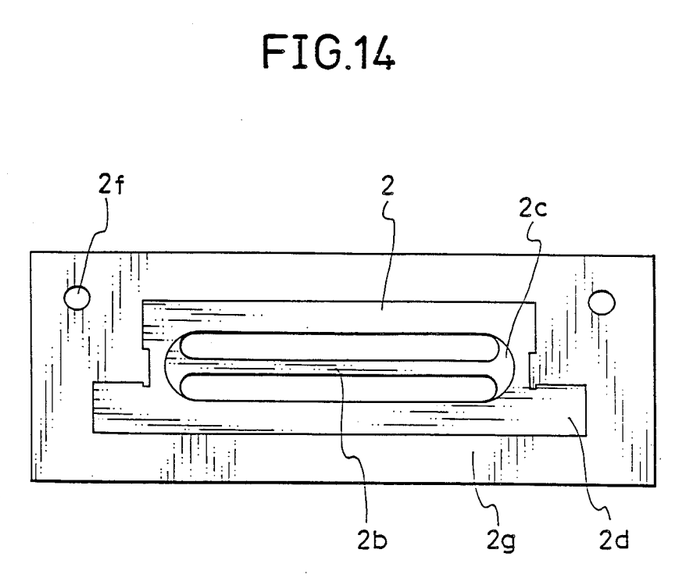

FIG. 14 shows a trimming step in which the sheet metal thus blanked and formed with the central retaining portion 2b having an inverted-U shape is then trimmed to have a contour having a desired shape using the alignment holes 2f, 2f as a reference. As a result of this trimming step, a scrap portion 2g is removed from the sheet metal and discarded. The trimmed sheet metal thus has a pair of tabs 2d, which are formed into supporting tabs, on both ends. Then, a piercing step is applied to form a mounting hole in each of the tabs 2d, which is followed by a bending step to bend each of the tabs 2d, 2d at right angles to define the supporting tabs as shown in FIG. 9, thereby completing the process for manufacturing the retainer 2.

In the above-described process, the forming step is most critical, in which step only the curved end parts 2c, 2c of the central retaining portion 2b is subjected to plastic deformation when formed into a desired shape. For this reason, the remaining part of the central retaining portion 2b receives minimum applied force and remains virtually non-deformed so that the forming step can be carried out at high accuracy. As a matter of course, the shape of the central retaining portion 2b at its end parts after blanking is designed by taking into account deformation during the forming step.

Figure 4:
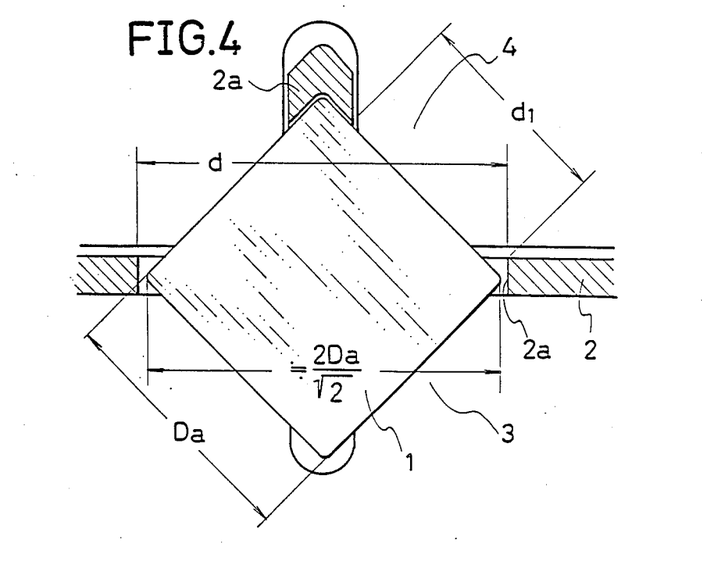
FIG. 4 is a schematic illustration showing part of a linear motion rolling-contact bearing having a retainer constructed in accordance with another embodiment of the present invention.

FIG. 4 schematically shows another embodiment of the present invention in which use is made of cylindrical rollers 1' as rolling members in a linear motion rolling-contact bearing. In this case, since the contact surface between the roller 1 and the guide groove directly affects the load bearing capability of the bearing, the effect of the present invention is remarkable. In the embodiment shown in FIG. 4, the retainer 2 includes the central retaining portion 2b which has an inverted V-shaped retaining surface; however, the central retaining portion 2b may have a flat retaining surface, if desired. As shown in FIG. 4, the width d of the slot or distance between the retaining end surfaces 2a, 2a is larger than the maximum size of the roller 1'.

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. In combination, a one-piece retainer and a linear motion rolling-contact bearing including a linear-extending rail and a slider, said bearing including a plurality of rolling members provided to roll along a predetermined endless passage defined by a pair of straight load sections and a pair of curved connecting sections each connecting corresponding ends of said pair of straight load sections in said slider, said retainer comprising:

a flat base portion extending between said rail and slider and being connectible to said slider, said flat base portion provided with an elongated straight slot which extends along a straight load section of said endless passage, said slot having a width which is larger than the maximum size of each of said rolling members, said slot including a pair of opposed end surfaces for limiting the lateral movement of said rolling members in said straight load section and in a direction generally in parallel with a plane defined by said flat base portion, such that a center of each of said rolling members when located in each of said pair of straight load sections is located at a side of said slider with respect to a plane defined by an outer surface of said flat base portion which is opposite to an inner surface of said flat base portion in contact with said slider;

a central retaining portion which is integrally formed with said flat base portion and formed in the shape of a "U" with both ends connected to the ends of said slot, thereby providing a structural enclosure for retaining said rolling members in said straight load section when rolling therethrough; and mounting means for mounting said retainer, in said slider of said bearing, between said slider and said rail.

2. The combination of claim 1 wherein said mounting means includes a mounting tab which is formed by bending a part of said base portion.

3. The combination of claim 2 wherein said mounting tab is formed with at least one mounting hole.

4. The combination of claim 1 wherein said linear motion rolling-contact bearing includes a rail and a slider assembly provided to straddle said rail, wherein said straight load section is defined between a pair of opposed guide grooves which are formed on opposed surfaces of said rail and said slider assembly.

5. The combination of claim 1 wherein said rolling members are spherical in shape.

6. The combination of claim 1 wherein said rolling members are cylindrical in shape.

7. The combination of claim 1 wherein said flat base portion is provided with opposed side retaining portions each opposed side retaining portion having a retaining end surface extending along the side of said elongated, straight slot whereby said retaining end surfaces and said central retaining portion retain said balls in said straight load section when rolling therethrough.

* * * * *